Figure 1:
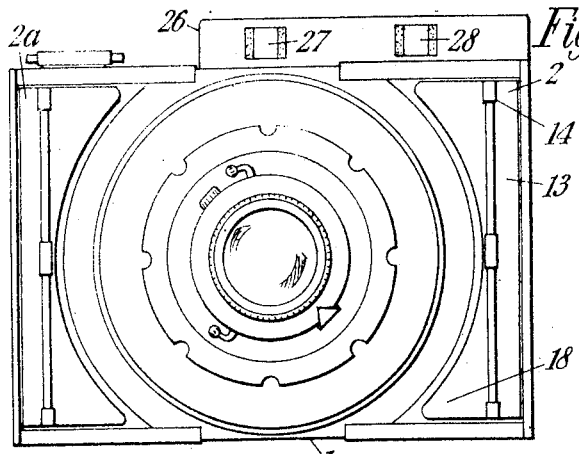

Sept. 12, 1950 W. H. LIVENS 2,522,387
CAMERA HAVING MOVABLE ROLL FILM BODY PARTS
FOR TAKING DIFFERENT SIZE EXPOSURES
Filed Sept. 24, 1945 4 Sheets-Sheet 1

Inventor
W. H. Livens

Sept. 12, 1950 W. H. LIVENS 2,522,387
CAMERA HAVING MOVABLE ROLL FILM BODY PARTS
FOR TAKING DIFFERENT SIZE EXPOSURES
Filed Sept. 24, 1945 4 Sheets-Sheet 2

Inventor
W. H. Livens

Inventor
W. H. Livens

Sept. 12, 1950  W. H. LIVENS  2,522,387
CAMERA HAVING MOVABLE ROLL FILM BODY PARTS
FOR TAKING DIFFERENT SIZE EXPOSURES
Filed Sept. 24, 1945  4 Sheets-Sheet 4

Inventor
W. H. Livens

UNITED STATES PATENT OFFICE 2,522,387

CAMERA HAVING MOVABLE ROLL FILM BODY PARTS FOR TAKING DIFFERENT SIZE EXPOSURES

William Howard Livens, Hampstead, England

Application September 24, 1945, Serial No. 618,270
In Great Britain October 7, 1944

4 Claims. (Cl. 95—31)

This invention relates to photographic roll film cameras and has for its object to improve the construction and arrangement of such cameras so as to make them more adaptable in use and in some cases to provide a more compact construction than has hitherto been attainable for a given maximum size of picture.

The invention consists broadly in a roll-film camera embodying means for varying at will the frame size, that is, the area of sensitive material exposed, the said means being associated with other means adapted to position the film according to the particular frame size in use.

The particular means adopted for varying the frame size may comprise hinged or sliding doors, shutters, curtains, blinds, or the like, arranged one upon either side of the centre line through the lens, or I may provide the film spools upon separate end portions of the camera casing and arrange for the change of frame size to be effected by sliding these end casing portions, and hence the film spools, into or out of a main and central portion of the camera casing.

The invention also consists in linking with the means for varying the frame size, means for automatic variation of the view-finder so that the limits of the image seen in the latter should approximate that formed on the sensitive material with the frame size for the time being in use.

In carrying my invention into effect in one convenient manner I provide a roll film camera, the body or casing of which may be formed with a central part and two lateral slidable parts carrying the respective spools for the film, such slidable parts embodying a plate or plates by which the frame size may be adjusted, the arrangement being such that the distance between the spools will be increased as the frame size is increased and vice-versa will be reduced as the frame size is reduced. The frame size may be pre-set and the camera made ready for taking a picture on pressing the opening stud or similar device or, alternatively, the camera might be arranged so that an intermediate frame size is in place on opening and the film spools may then be further separated to give the largest frame if required or closed in from the initial position to give the smallest frame size. With such an arrangement it will be seen that the compass of the film camera can be kept down to that required to house the necessary parts, namely, the film spools, lens, shutter and focussing and range-finding devices which may be used, and the construction may therefore be made more compact since the closed over-all size is not directly determined by the maximum frame size possible with the camera.

Further in accordance with the invention I link the frame adjusting means with means for varying the field of the view finder so that the limits of the image seen in the latter will approximate to those of the image formed on the sensitive material with the particular frame size in use.

Also in accordance with the invention I propose to employ a coloured transparent mask, or masks, in the main or a supplementary view-finder, so that the field possible with each frame may be seen at a glance and the most suitable frame size chosen. Thus for a camera using this device and arranged, say, for three frames, the finder field corresponding to the smallest frame could be left clear, the additional field for the intermediate frame might be green and the extension of the field corresponding to the full frame might be masked with red, and suitable indicators may be provided to show for which frame the camera is set. Likewise, if the masks are linked to the frame-changing mechanism for changing the area of film to be exposed, the field corresponding to the frame for which the camera is set can be clear, and the full frame (if not in use) can be shown coloured for comparison.

As for some kinds of composition it is an advantage to see more than the field which will register, so that selection may be made easily and best composition chosen for the picture, this need can be met by providing a coloured border outside the full frame or frame in use (which would preferably be suitably outlined).

With a variable frame camera direct vision finders not embodying lenses can be made with wires or masks and may be divided to indicate the field limits for each frame, and such devices also may be altered by or have indicators showing the frame in position which may be linked to the frame-changing mechanism.

I also make provision to adjust the position of the film according to the frame in use and to indicate the portion of the film in use by the employment of suitable windows in the camera back and appropriate markings on the backing paper, (such windows may be opened or closed by or according to the frame setting) or by automatic winding devices and counters and in either case I may also employ suitable spring tensioning of the magazine roller or other means so that unwanted film can be taken up on the magazine spool when the size of the frame is reduced. These mechanical adjustments can be linked with the shutter wind or release or, as I prefer, means may be provided after each exposure to prevent the shutter being set or released unless fresh film has been positioned for the taking frame in use.

While my invention is easily incorporated in simple and inexpensive camera designs, it is equally advantageous for instruments of the highest class, because it enables a wide-angle lens of large aperture to be used to the greatest advantage, as the entire field may be used for the full frame, while for normal work where a narrow angle gives a more pleasing perspective, using a reduced frame not only saves film, but as the centre field for any lens receives most light, advantage may be taken of this property and the exposure can be shorter than that necessary if the whole lens field is used.

One simple construction for a precision camera embodying my invention would comprise a central body with slidable spool chambers linked to the frame-changing, film numbering and viewfinder adjusting devices, a draw tube or tubes nesting in the central body when closed and when in the taking position locked to the focussing adjustment (which operates the range finder when provided).

The focussing device can be an annulus with male or female threads screwing in and out of a socket, or working on a nipple suitably attached to the camera body, and to increase the movement available with a given depth of annulus, the rotating ring may have inner and outer threads right and left handed and the necessary matching parts. If it is necessary or convenient to prevent rotation when focussing of the lens (and shutter if a between-lens shutter is used), I provide a collar free to rotate in the focussing annulus but prevented from rotating relative to the camera body, and the draw tube or tubes and extension members are locked positively to this collar and the range finder also is actuated by it.

The lens is preferably mounted in an inner sliding member, which nests in the draw-tube when the camera is closed, together with the lens, lens hood and shutter (if between lens type), but in the taking position this member is locked in place.

When a lens camera is closed the hood if provided can be pressed back and protected by the dust cap or other cover protecting the lens; this cover may be fitted to or integral with the camera, or its case.

Figure 2:
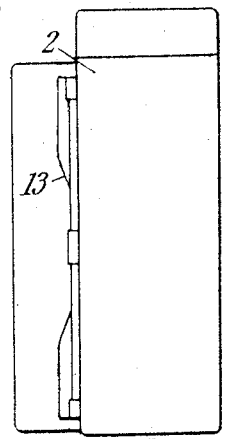
Figure 3:
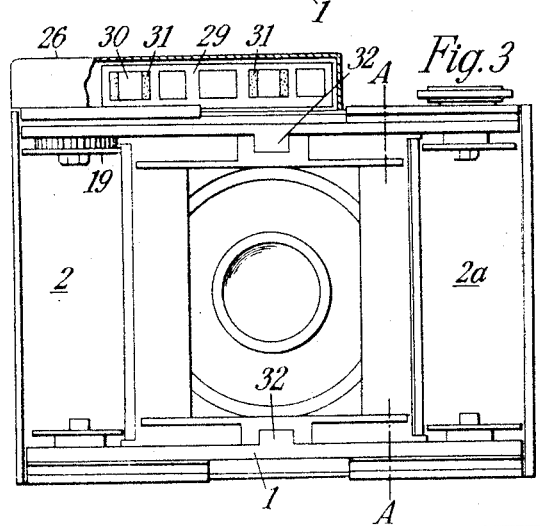
Figures 4, 5:
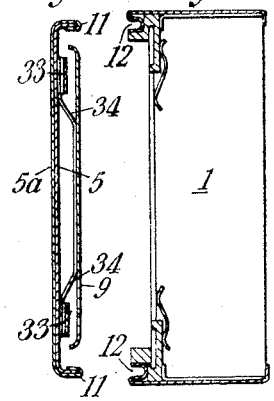
Figure 6:
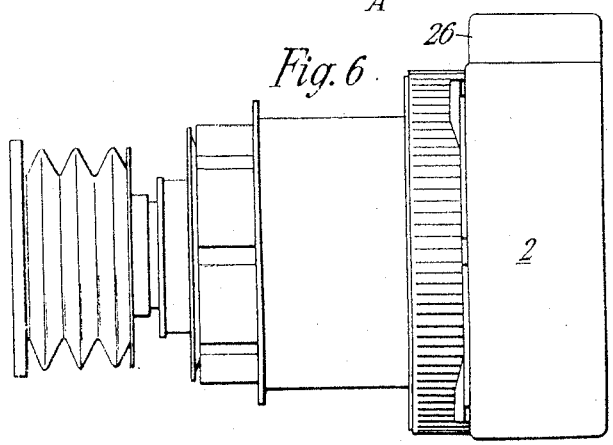
Figure 7:
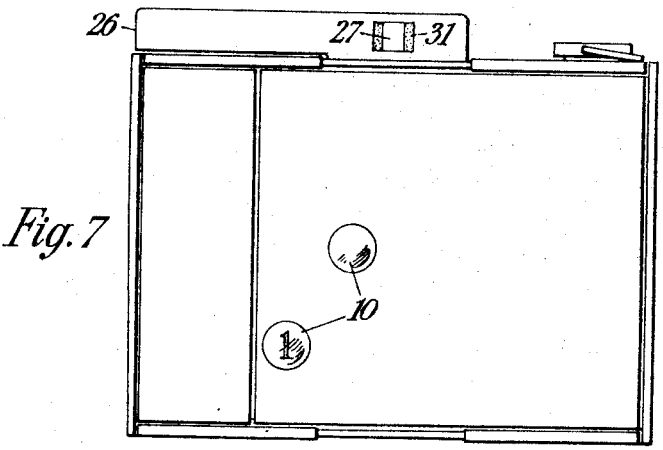
Figure 8:
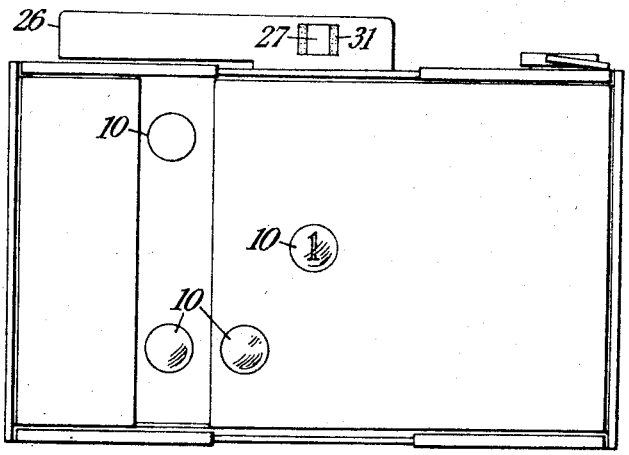
Figure 9:
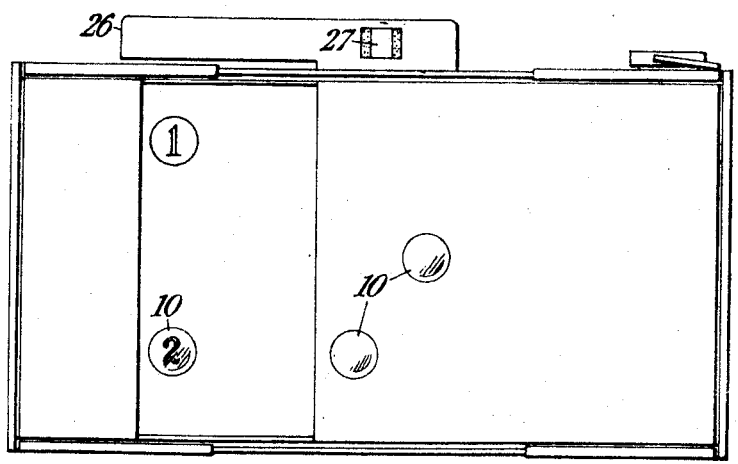
Figure 10:
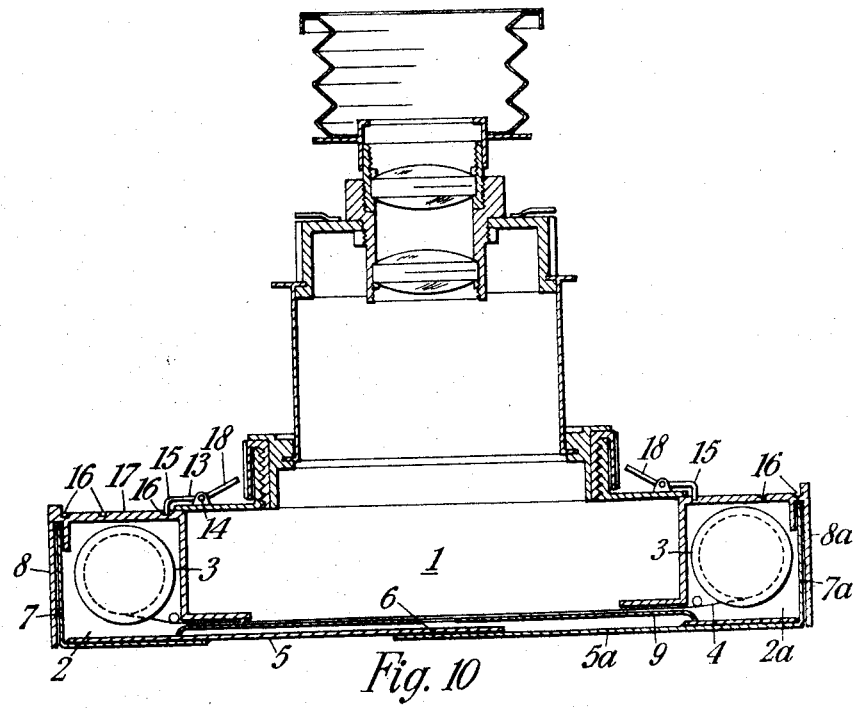
Figure 11:
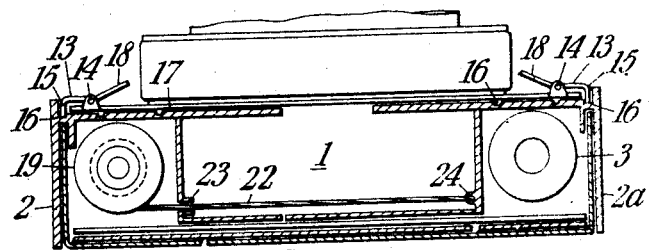
Figure 12:
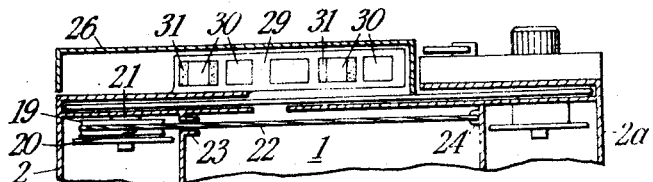
Figure 13:
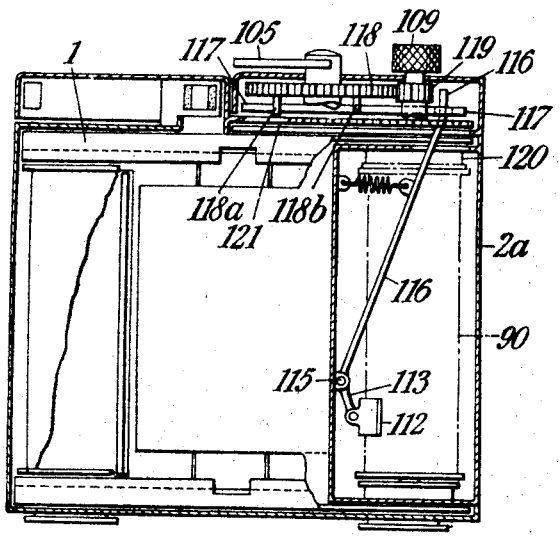
Figure 14:
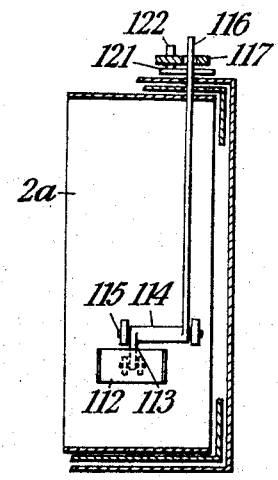
Figure 15:
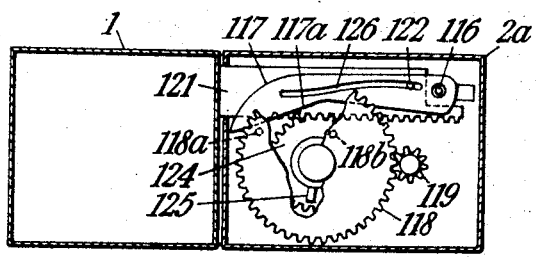

In the accompanying drawings, which are of a diagrammatic character:

Figure 1 is a front elevational view of one form of camera in accordance with the invention, Figure 2 is a side elevational view of Figure 1 with a front protecting cap applied, Figure 3 is a rear view of Figure 1 showing the back of the camera open and the view and range finding housing cut away to show the sliding mask mechanism which is attached to the sliding magazine spool chamber, Figure 4 is a cross section through the removable back cover of the camera casing as seen if the section was taken on the line A—A of Figure 3, Figure 5 is a cross section of the camera casing on the line A—A of Figure 3, Figure 6 is a side view of the camera shown in the operative condition, Figures 7, 8 and 9 are back views of the camera showing the same adjusted for three different frame sizes, Figure 10 is a central horizontal section of the camera in the operative condition and set for the largest frame size, Figure 11 is a plan view of a camera according to Figures 1 to 10 showing a rewinding device, Figure 12 is a fragmentary elevational view of Figure 11, Figures 13 to 16 are detail views of the automatic winding device provided in accordance with my invention.

Referring to the drawings and considering first Figures 1 to 12, I have shown therein a roll film camera the body of which is formed by a central part 1 and two lateral parts 2, 2a which are slidable upon the ends of the central body part and carry the film spool mountings 3 which are enclosed within their respective slidable lateral parts and by means of which slidable lateral parts the frame size may be adjusted, the arrangement being such that the distance between the film spools will be increased as the frame size is increased and vice-versa will be reduced as the frame size is reduced.

The film, which is guided in the usual manner, is indicated at 4 and at the rear of the body there is fitted a slidable back which is formed by a pair of plates 5 and 5a which overlap each other at the center as indicated at 6 and at their outer ends have inwardly directed side walls 7 and 7a which fit into recesses formed in the end walls 8, 8a of the slidable spool chambers 2 and 2a so that the overlapping back plates are constrained to partake of the adjusting movements of these spool chambers, the construction and arrangement being such however that the back cover can be removed as a whole to expose the interior of the camera casing and the whole casing construction being such as provides for the obtaining of the necessary light proof condition.

The removable back cover is employed in association with a resilient pressure plate 9 which is loosely supported by spring members 34 in the stirrup members 33 attached to the sliding plates 5 and 5a and this plate and also the overlapped plates of the cover have transparent openings 10 therein so disposed in relation to one another and with respect to their different parts that different openings will be brought into register with one another as the camera is adjusted to the different frame sizes to show the numbering on the film therethrough. Movement of the pressure plate relative to the body is prevented by the lugs 32 shown in Figure 3.

One type of backed film which is suitable for use with a camera constructed in accordance with the invention is provided with three sets of numbers upon the backing paper to indicate the number and position of the various exposures provided for. For example, the set of numbers towards one edge of the film allows for eight full size pictures, the set of numbers to the middle of the film allows for twelve square pictures, while the set of numbers towards the other edge of the film allows for sixteen half size pictures in the length of the film. The apertures and windows provided at the back of the camera are so arranged that the appropriate number is seen therethrough when the camera is adjusted to expose the corresponding size of picture. There are three members covering the film backing, viz. the pressure plate, the sliding plate 5 and the sliding plate 5a. In the fully closed position of the sliding members the camera is adjusted to take half size pictures as shown in Figure 7. In this position windows in plates 5 and 5a and the pressure plate coincide to show the figures denoting the position of the film required for taking half size pictures. The window in use in this position is indicated by the numeral 1 on the backing paper. The other window shown in this figure is covered at the back by the sliding plate 5. In the intermediate position of the sliding members on the camera back the window in the plate 5a opposite the central row of numbers coincides with windows in the sliding member 5 and the pressure plate to expose the numeral 1 in the central row. Both of the windows in the plate 5 corresponding to the two outer rows of figures are covered in this position by the pressure plate. In the fully extended position both windows in the sliding plate 5 seen in the Figure 9 coincide with windows in the pressure plate, thus exposing the two outer numerals 1 and 2. If an even number of half pictures have been taken a figure will appear at the upper window on expanding the camera, but if an odd number of half pictures have been previously taken an odd number will appear at the lower window. If the latter is the case the film after exposure will have to be turned to the next odd number to completely remove the exposed film. When the number appears at the top window the film will require to be moved to the next figure at this window. When changing from square to full size pictures the position of the film will require slight adjustment until the next figure appears in one or other of the two windows.

Along its longitudinal edges 11 the removable back cover for the camera casing fits into rabbets 12 formed at the back of the casing.

The camera construction as illustrated is designed to provide for the obtaining of three different frame sizes, the smallest size being obtained when the end spool chambers are pushed fully into the camera body (Figures 1, 3, 7, 11 and 12 corresponding to this position) the intermediate frame size being obtained when the end spool chambers are pulled part of the way out of the central body part (Figure 8 corresponding to this position) and the maximum frame size being obtained when the end spool chambers are pulled out further from the central body part (Figures 9 and 10 corresponding to this position).

Spring biased latch plates 13 pivotally mounted at 14 upon the front of the central body part of the camera and having claw ends 15 engageable in notches 16 in the front walls 17 of the slidable end spool chambers serve to locate the spool chambers in the particular position to which they are set, there being three notches for each spool chamber, in the particular example illustrated, disposed at longitudinally spaced intervals and the latch plates being actuated to release their claw ends from the notches by the depression of thumb or finger plates 18 incorporated in the latch plates.

Besides providing for a change of the frame size I also provide for the simultaneous adjustment of the position of the film to provide that the film registers with the particular frame in use without undue waste.

One means for ensuring this is shown in Figures 11 and 12.

Referring to these figures a cable drum 19 is shown integral with the top assembly 20 of the magazine spool holder and is hollow and contains a clock spring (not shown) one end of which is fastened to the drum and the other end to a bush 21, which is fastened to the top of the corresponding sliding spool chamber, and forms a bearing for the central pin of the drum. The spring is arranged so that when tensioned it tends to rotate the drum 19 clockwise, (looking down on the camera). This movement is controlled by a cable 22 which is wrapped round and fastened to the drum 19 and has its 'free' end passed through a sleeve 23 on the inner wall of the spool chamber 2, the cable being fastened at its opposite end 24 to the wall of take-up spool chamber 2a whereby when the sliding spool chambers are drawn apart the cable rotates the magazine spool holder 19 and thereby assists in the paying-out of the film. When the frame is changed to a smaller size by bringing the spool chambers together, the spring in the drum 19 causes this drum to rotate clockwise so that the magazine spool may take up the surplus film. For spool sizes requiring more than the usual friction between the spool and its holder, to tension the film, a clutch, not shown, is provided so that the spool is positively driven, (using the usual type of spool key), when rewinding, but is free when the film is drawn forward by the take-up spool.

The view finder and the range finder are provided in a casing 26, Figures 1 and 12, on the top of the central part of the camera casing. The view finder and the range finder are of suitable known design and are indicated generally at 27 and 28, Figure 1, respectively but in order that the limits of the image seen in the view finder may approximate to that formed on the sensitive surface of the film for the frame in use I provide a mask member 29, Figure 3, in association with the windows of both the view and range finders and connected to the magazine spool chamber 2 to partake of a sliding motion to cause transparent windows 30 in the mask member corresponding to the particular frame size in use to be positioned where these windows coincide with their respective windows of the view and range finders and serve to limit the field of view to correspond with the particular frame size in use.

The said windows in the mask member may have transparent coloured end portions 31, Figure 3, which enable the full frame field to be seen when the camera is set for, say a half frame, but leave the centre part of the window clear to prevent confusion.

For cameras using perforated unbacked film, a sprocket can be used to measure off the film required for the frame in use, and the sprocket can be controlled by the frame change mechanism.

For automatic winding I prefer to use a flyback key connected to the take-up spool by a suitable clutch so that motion is only imparted to the take-up spool when the key is turned forwards, but the clutch action allows the key to fly back freely. Stops operated by the frame-setting mechanism limit the forward motion of the key to the amount suitable for the frame in use and movement of the key turns the exposure counter through suitable gear and cocks the shutter through a suitably sprung connection (the springing preventing damage when larger frames are found on), as the shutter must cock for the smallest frame in use.

Experiment shows that if full advantage is taken of the extra film allowed by the makers at each end of the spool, it is possible with certain spool sizes to set the film by a hand winding key for the first frame and then to use a simple automatic wind for half frames or full frames turning the take-up spool holder an equal amount for each exposure (according to the frame size), without overlapping of the early frames (when the diameter of the take-up spool holder is least) or getting the last frame beyond the usable portion of the film, a fly back handle and clutch being used to actuate the automatic wind and a counter to indicate the number of exposures made and amount of film remaining for further exposures. With this system when used in a variable frame camera it is important to wind on the film without changing the frame size after making an exposure, after the film has been wound on the frame size can be changed if desired. To prevent double exposure and for rapid working it is advantageous to arrange that the automatic film wind should cock the shutter. This is well known practice, and means of compensating for the varying diameters of the take-up spool are also known.

A preferable method of automatically winding the film is illustrated in Figures 13 to 16 and involves the use of a pinion 124 carrying a stop 125 which may be concentric with but separate from the fly back gear wheel or winding pinion 118. The stop 125 on the pinion 124 limits the rotation of the gear wheel 118 on the winding stroke as the pin 118b on pinion 118 comes up against the stop 125. The stop 125 is set by turning the pinion 124 automatically, as the frame size is changed, by means of a rack 121 fastened to the central body part of the camera and engaging the pinion 124, the latter being mounted on the sliding take-up spool chamber 2a (as shown in Figures 1 to 10), so that on changing the frame size the rack rotates the pinion and sets the stop 125. Provision is made to move the counter an amount corresponding to a half-frame forward when changing from half to full-frame and vice-versa.

A shaped plate 112 presses lightly upon the take up spool 90 and moves towards the centre of the camera as spool increases in diameter and this movement is transferred through the short arm 113 of a lever pivoted to the plate 112 and fastened to a sleeve 114 to which the longer arm 116 of this lever is connected.

The sleeve 114 is supported upon an axle pin 115 in bearings fastened to the inner wall of the take-up spool chamber 2a. The upper end of the arm 116 acts as a pivot for and also causes the compensator plate 117 to slide relatively to the top of the take-up spool chamber, this compensator plate forming a stop for a pin 118a on the automatic winding pinion 118, which drives the take-up spool through a pinion 119 and a clutch housed at 120.

The rack 121 carries a pin 122 which engages in a slot 126 in the compensator plate 117, this pin by sliding in the slot serves to locate the compensator plate in the position corresponding to the frame in use. The arc described by the winding key 105 on the winding stroke is determined by the position of the stop 125 while the position to which the fly back pinion returns at the end of the fly back stroke depends upon the point of contact of the stop 118a on the inclined edge 117a of the compensator plate, this point of contact being determined by the diameter of the take up spool as explained, and also by the frame size in use.

Figure 16:
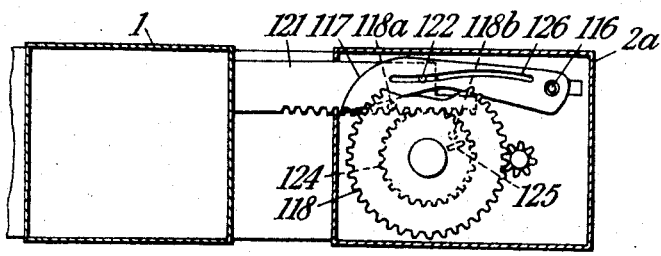

Figure 16 shows the position of the stops for the automatic winding key for the full-frame size and illustrates the necessary increase in the compensatory action required for the larger frame compared with the smaller frame.

The fly back mechanism comprising a clutch and return spring is housed in a known manner at the end of the spool at 120, while the knob 109 is directly operative on the spool by means of a rod which passes through the fly back mechanism without connection thereto. The knob 109 is directly connected with the spool 90 for adjustment when loading and unloading the camera. The winding key 105 is used to set the film between exposures by rotating the same in a clockwise direction to wind up the film through the coupled pinions 118 and 119 and the clutch housed at 120. The extent of movement in a clockwise direction is governed by the engagement of the pin 118b with the stop 125. On release of the winding key 105 the same, together with the pinion 118, is returned in a counter-clockwise direction by the spring also housed at 120 until the pin 118a on the pinion 118 engages the abutment 117a.

I claim:

1. In a roll film camera a body and two lateral parts slidably engaging one another for movement towards and away from one another and the body, means for adjusting the relationship between the two lateral parts and between the latter and the body for adjustably varying the frame size of the picture taken, film spool supporting means attached to and movable with the said two lateral parts of the body so that the film area is varied to correspond with the frame size for which the lateral parts have been adjusted, an apertured view finder attached to the body having apertures therein corresponding to the frame sizes determined by the adjustment of the lateral parts, view finder masking means attached to one lateral part of the camera and movable therewith to mask the apertures of the view finder to limit the field seen in the view finder to that determined by the frame size corresponding to the adjustment of the lateral parts.

2. A roll film camera as claimed in claim 1 wherein the said masking means for limiting the field of the view finder includes a sliding mask slidable with the said one part and having transparent windows therein.

3. In a roll film camera, a body in two lateral parts slidably engaging one another for movement towards and away from one another, means for adjusting the relationship between the two lateral parts and between the latter and the remainder of the camera, film spool supporting means attached to the said two lateral parts of the body, windows in the lateral parts of the body for viewing the numbers provided on the back of the film backing in the camera, the said windows being positioned in the lateral parts opposite each row of numbers of different spacing such that by adjusting the adjusting means, a window in the one lateral part coincides with the window in the other lateral part to expose to view the row of numbers on the film backing appropriate to the area of film exposed for use.

4. In a roll film camera, a body in two lateral parts slidably engaging one another for movement towards and away from one another, means for adjusting the relationship between the two lateral parts and between the latter and the remainder of the camera, film spool supporting means attached to the said two lateral parts of the body, masking means attached to the said two lateral parts of the body so that by changing the size of the body and thus the distance between the spool supporting means different areas of film are exposed for use, a film winding key, a winding pinion rotatable thereby, a first stop member carried by said pinion, means operably connected with one of the lateral parts including an abutment movable in response to the movement of said part and engageable by said stop member to limit the movement of said pinion and key in one direction, a second stop member carried by said pinion, means including a second abutment movable in response to change in film diameter on a take-up spool, said second stop member being engageable with said second abutment to limit the movement of the pinion and winding key in the reverse direction, and a fly back spring and clutch cooperable with said winding key to drive the same in said second direction.

WILLIAM HOWARD LIVENS.

REFERENCES CITED

The following references are of record in the file of this patent:

UNITED STATES PATENTS

| Number | Name | Date |
|---|---|---|
| 702,464 | Niss | June 17, 1902 |
| 1,031,023 | Peters | July 2, 1912 |
| 1,032,867 | Steadman et al. | July 16, 1912 |
| 1,068,895 | Harper | July 29, 1913 |
| 1,293,864 | Morton | Feb. 11, 1919 |
| 1,344,207 | Miles | June 22, 1920 |
| 1,680,647 | Stark | Aug. 14, 1928 |
| 1,814,973 | Silva | July 14, 1931 |
| 1,847,531 | Kesses | Mar. 1, 1932 |
| 1,897,268 | Merle | Feb. 14, 1933 |
| 1,947,482 | Mihalyi | Feb. 20, 1934 |
| 2,233,238 | Baumgartner | Feb. 25, 1941 |
| 2,233,239 | Baumgartner | Feb. 25, 1941 |
| 2,247,104 | Takacs | June 24, 1941 |

FOREIGN PATENTS

| Number | Country | Date |
|---|---|---|
| 34,810 | France | May 21, 1929 |

1st Addition of Patent No. 626,300